United States Patent [19]

Yamamura et al.

[11] Patent Number: 4,770,935
[45] Date of Patent: Sep. 13, 1988

[54] INORGANIC FIBROUS MATERIAL AS REINFORCEMENT FOR COMPOSITE MATERIALS AND PROCESS FOR PRODUCTION THEREOF

[75] Inventors: Takemi Yamamura; Toshihiro Ishikawa; Masaki Shibuya; Yoshiharu Waku, all of Ube, Japan

[73] Assignee: Ube Industries, Ltd., Ube, Japan

[21] Appl. No.: 80,305

[22] Filed: Jul. 31, 1987

[30] Foreign Application Priority Data

Aug. 8, 1986 [JP] Japan .................. 61-185156

[51] Int. Cl.$^4$ .............................. D02G 3/00
[52] U.S. Cl. ................... 428/366; 428/224; 428/367; 428/375; 428/379; 428/389; 428/408
[58] Field of Search ............... 428/238, 245, 260, 284, 428/367, 364, 379, 366, 375, 389, 408, 224, 446, 288, 289; 501/80, 90, 96; 524/458, 230, 443; 523/458; 264/66

[56] References Cited

U.S. PATENT DOCUMENTS

| | | | |
|---|---|---|---|
| 4,100,233 | 7/1978 | Yajima et al. | 525/477 |
| 4,283,376 | 8/1981 | Yajima et al. | 423/345 |
| 4,342,712 | 8/1982 | Yajima et al. | 528/477 |
| 4,347,347 | 8/1982 | Yajima et al. | 528/35 X |
| 4,359,559 | 11/1982 | Yajima et al. | 525/475 |
| 4,610,917 | 9/1986 | Yamamura et al. | 428/238 X |
| 4,618,529 | 10/1986 | Yamamura et al. | 428/260 |
| 4,622,270 | 11/1986 | Yamamura et al. | 428/608 |
| 4,663,229 | 5/1987 | Yajima et al. | 428/364 |

FOREIGN PATENT DOCUMENTS

| | | |
|---|---|---|
| 1485896 | 9/1977 | United Kingdom . |
| 1572460 | 7/1980 | United Kingdom . |
| 0161828 | 11/1985 | United Kingdom . |

*Primary Examiner*—Lorraine T. Kendell
*Attorney, Agent, or Firm*—Ladas & Parry

[57] ABSTRACT

An inorganic fibrous material for reinforcing composite materials, said fibrous material composed of a central layer and a surface layer, wherein
the surface layer is formed of an inorganic material composed of
(i) an amorphous material consisting substantially of Si, M, C and O, wherein M is Ti or Zr, or
(ii) an aggregate consisting substantially of ultrafine crystalline particles of beta-SiC, MC, a solid solution of beta-SiC and MC, and $MC_{1-x}$ having a particle diameter of not more than 500 Å wherein M is as defined above and x is a number represented by $0<x<1$, and optionally containing amorphous $SiO_2$ and $MO_2$, or
(iii) a mixture of the amorphous material (i) and the aggregate (2), and
the central layer is formed of an inorganic material other than said inorganic material; and a process for production thereof.

8 Claims, No Drawings

1

INORGANIC FIBROUS MATERIAL AS REINFORCEMENT FOR COMPOSITE MATERIALS AND PROCESS FOR PRODUCTION THEREOF

BACKGROUND OF THE INVENTION

1. Field of the Invention

This invention relates to an inorganic fibrous material which is useful as a reinforcement for composite materials and has improved wetting property with respect to metals, plastics or ceramics as a matrix of the composite materials, and to a process for producing the inorganic fibrous material.

2. Description of the Prior Art

Metals, plastics and ceramics reinforced with inorganic fibers such as carbon fibers and alumina fibers as a reinforcing material, known respectively as FRM, FRP and FRC, have attracted wide attention as structural materials having high mechanical strength.

Inorganic fibers used for production of composite materials are required to have high mechanical strengths such as tensile strength and modulus of elasticity and good wetting property with respect to metals, plastics and ceramics as a matrix, and to undergo little degradation by reaction with the matrix.

Carbon fibers have excellent strength and modulus of elasticity, but very bad wetting property with resepct to a matrix such as molten aluminum. Furthermore, carbon fibers tend to react with molten aluminum at high temperatures and cause a drastic reduction in the strength of the resulting composite material. Hence, if the carbon fibers are directly used to reinforce composite materials, the resulting products cannot have the desired mechanical strength.

Some methods have been proposed in an attempt to eliminate the above inconveniences. For example, Japanese Laid-Open patent publication No. 85,644/1980 discloses a method which comprises coating the surface of carbon fibers with a polymeric organosilicon compound such as polycarbosilane, polysilane or polycarbosiloxane, and rendering the polymeric organosilicon compound inorganic thereby to form a ceramic composed mainly of silicon carbide as a surface layer. Japanese Laid-Open patent publication No. 53,728/1984 discloses a method which comprises providing a vitreous layer on the surface of carbon fibers, coating it with a polymeric organosilicon compound such as polycarbosilane, polysilane or polycarbosiloxane, and rendering the polymeric compound inorganic to form a surface layer.

The method of Japanese Laid-Open patent publication No. 85,644/1980 is not satisfactory because the adhesion of the central carbon fiber layer to the surface layer is low and strains remain between the two layers with the result that the fibers themselves have reduced tensile strength and flexibility.

According to the method disclosed in Japanese Laid-Open patent publication No. 53,728/1984, the resulting reinforcing fibers themselves have good mechanical strength, but the wetting property of the carbide forming the surface layer with respect to a plastic or molten metal is not sufficient. Furthermoe, since the carbide has high reactivity with a molten metal such as molten aluminum, a composite material having satisfactory mechanical strength cannot be obtained by using the resulting reinforcing fibers.

SUMMARY OF THE INVENTION

It is an object of this invention to provide an inorganic fibrous material composed of a central layer and a surface layer thereon, which is useful for reinforcing a composite material, and in which there is little residual strain between the central layer and the surface layer and the adhesion strength between the two layers is high.

Another object of this invention is to provide an inorganic fibrous material which is useful for reinforcing a composite material and has very good wetting property with respect to plastics and molten metals.

Still another object of this invention is to provide a process for producing an inorganic fibrous material which is useful for reinforcing a composite material and has such wetting property as mentioned above.

According to this invention, there is provided an inorganic fibrous material for reinforcing composite materials, said fibrous material composed of a central layer and a surface layer, wherein
the surface layer is formed of an inorganic material composed of
  (i) an amorphous material consisting substantially of Si, M, C and O wherein M is Ti or Zr, or
  (ii) an aggregate consisting substantially of ultrafine crystalline particles of beta-SiC, MC, a solid solution of beta-SiC and MC, and $MC_{1-x}$ having a particle diameter of not more than 500 Å wherein M is as defined above and x is a number represented by $0<x<1$, and optionally containing amorphous $SiO_2$ and $MO_2$, or
  (iii) a mixture of the amorphous material (i) and the aggregate (2), and
the central layer is formed of an inorganic material other than said inorganic material.

According to this invention, there is also provided a process for producing an inorganic fibrous material for reinforcing composite materials, which comprises a first step of applying polytitanocarbosilane or polyzirconocarbosilane to an inorganic fibrous material forming a central layer, a second step of heating the inorganic fibrous material in an oxygen-containing gaseous atmosphere to render the polytitanocarbosilane or polyzirconocarbosilane infusible, and a third step of heating the infusible inorganic fibrous material in a non-oxidizing atmosphere to form an inorganic surface layer.

DETAILED DESCRIPTION OF PREFERRED EMBODIMENTS

The inorganic fibrous material forming the central layer in this invention includes, for example, inorganic fibers such as carbon fibers, alumina fibers, silicon carbide fibers and boron fibers, and ceramic whiskers such as silicon carbide whiskers and silicon nitride whiskers. The carbon fibers which are porous and have a small fiber diameter are particularly preferred. The carbon fibers may be obtained from polyacrylonitrile or pitch.

The diameter of the inorganic fibrous material forming the central layer varies depending upon its type. Usually, the fibers have a diameter of 1 to 200 micrometers, and the whiskers have a diameter of 0.1 to 2 micrometers.

The surface layer bonded to the central layer is formed of an inorganic layer composed of
  (i) an amorphous material consisting substantially of Si, M, C and O wherein M is Ti or Zr, or (ii) an aggregate consisting substantially of ultrafine crystalline particles of beta-SiC, MC, a solid solution of beta-SiC and MC, and $MC_{1-x}$ having a particle diameter of not more than 500 Å wherein M is as defined above and x is a number represented by $0<x<1$, and optionally containing amorphous $SiO_2$ and $MO_2$, or (iii) a mixture of the amorphous material (i) and the aggregate (2).

The inorganic layer forming the surface layer has a thickness of usually 0.1 to 50 micrometers, preferably 0.5 to 10 micrometers.

The polytitanocarbosilane or polyzirconocarbosilane (to be sometimes referred to simply as "precursors") used as a precursor for forming the inorganic surface layer in this invention may be produced, for example, by the methods described in U.S. Pat. Nos. 4,347,347 and 4,359,559.

One example of the method of its production comprises adding polycarbosilane having a number average molecular weight of 200 to 10,000 and mainly containing a main-chain skeleton represented by the formula

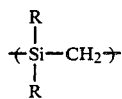

wherein R represents a hydrogen atom, a lower alkyl group or a phenyl group, and an organometallic compound of the formula $$MX_2$$

wherein M represents Ti or Zr, and X represents an alkoxy, phenoxy or acetylacetoxy group, so that the ratio of the total number of the structural units of  of the polycarbosilane to that of the structural units of $+M—O+$ of the organometallic compound is in the range of from 2:1 to 200:1, and reacting them under heat in an atmosphere inert to the reaction to bond at least part of the silicon atoms of the polycarbosilane to the metal atoms of the organometallic compound through oxygen atoms to produce a precursor of the inorganic layer.

The process of this invention for producing the reinforcing inorganic fibrous material will now be described.

In the first step, polytitanocarbosilane or polyzirconocarbosilane is applied to an inorganic fibrous material forming the central layer.

There is no limitation on the method of applying the precursor to the inorganic fibrous material. For example, it can be achieved by coating or immersing the inorganic fibrous material with or in the precursor in the molten state, or by immersing or coating the inorganic fibrous material in or with a solution of the precursor in an organic solvent such as hexane, heptane, benzene, toluene or xylene. The latter method is preferred because it can form a precursor layer of a uniform thickness efficiently on the surface of the inorganic fibrous material.

Preferably, the thickness of the precursor layer is 0.1 to 65 micrometers, especially 0.5 to 15 micrometers. A precursor layer of such a thickness can be obtained by adjusting the concentration of the precursor in the organic solvent to 1 to 15% by weight, and immersing the inorganic fibrous material in this solution. The concentration of the precursor in the organic solvent may be further increased, but increased concentrations are liable to cause thickness unevenness in the precursor layer.

In the second step of the process of this invention, the inorganic fibrous material to which the precursor has been applied is heated in an oxygen-containing gaseous atmosphere to render the precursor infusible.

Air is conveniently used as the oxygen-containing gas. The heating temperature is generally 100° to 300° C.

Heating gives rise to a three-dimensional structure in which silicon atoms in different chains are interrupted by oxygen atoms. This renders the precursor infusible. When fibers susceptible to oxidation such as carbon fibers are used as the inorganic fibrous material forming the central layer, heating at excessively high temperatures should desirably be avoided.

In the third step, the inorganic fibrous material having the infusible precursor as a surface layer is heated in a non-oxidizing atmosphere to form the aforesaid inorganic layer.

The heating temperature is usually 800° to 2,000° C.

The reinforcing inorganic fibrous material of this invention may be applied to such matrices as metals, ceramics and plastics.

Examples of the metals are aluminum, magnesium and alloys of these.

Examples of the ceramics are carbide ceramics such as silicon carbide, titanium carbide, zirconium carbide, vanadium carbide, niobium carbide, tantalum carbide, boron carbide, chromium carbide, tungsten carbide, and molybdenum carbide; nitride ceramics such as silicon nitride, titanium nitride, zirconium nitride, vanadium nitride, niobium nitride, tantalum nitride, boron nitride, aluminum nitride and hafnium, nitride; nitride ceramics such as silicon nitride, titanium nitride, zirconium nitride, vanadium nitride, niobium nitride, tantalum, nitride, boron nitride, aluminum nitride and hafnium nitride; and oxide ceramics such as alumina, silica, magnesia, mullite and cordierite.

Specific examples of the plastics include epoxy resins, modified epoxy resins, polyester resin, polyimide resins, phenolic resins, polyurethane resins, polyamide resins, polycarbonate resin, silicone resins, phenoxy resins, polyphenylene sulfide resins, fluorine resins, hydrocarbon resins, halogen-containing resins, acrylic resins, ABS resin, ultrahigh-molecular-weight polyethylene, modified polyphenylene oxide and polystyrene.

The reinforcing fibrous material of this invention has a high adhesion strength between the central layer and the surface layer and good wetting property with respect to matrices of composites, for example molten metals, plastics and ceramics. Hence, the bond strength between the reinforcing inorganic fibrous material and the matrix is high, and the resulting composite material has excellent mechanical strength even in a direction at right angles to the aligning direction of the inorganic fibers. For example, it has high flexural strength measured in a direction at right angles to the aligning direction of the fibers and high shear strength. Furthermore, since the reinforcing inorganic fibrous material of this invention undergoes little degradation by reaction with molten metals, a composite material produced by using it has excellent mechanical strength, and can withstand use for an extended period of time.

The various mechanical properties of a composite material produced by using the reinforcing fibrous material of this invention are measured by the following methods.

(A) Interlayer shear strength

A sample of a composite material having inorganic fibers (100×12×2 mm) aligned monoaxially is placed on two pins each having a length of 20 mm and a radius of curvature of 6 mm, and compressed by a presser having a radius of curvature of 3.5 mmR at its end by the so-called three-point bending method. The interlayer shear stress kg/mm$^2$) is measured and defined as the interlayer shear strength.

(B) Flexural strength in a direction perpendicular to the fibers

A fiber reinforced composite material having a thickness of 2 mm in which the fibers are aligned monoaxially is produced. A test piece 12.7×85 mm) is taken from it so that the axial direction of the test piece crossed the direction of the fiber alignment at right angles. The thickness of the test piece is 2 mm. A curvature of 125 mmR is provided in the central part in the thickness direction and the central part is finished in a thickness of about 1 mm. The test piece is subjected to the 3-point bending method. The flexural strength is expressed in kg/mm$^2$.

The interlayer shear strength and the flexural strength in a direction perpendicular to the fibers are measures of the strength of bonding between the matrix and the fibers.

(C) Tensile strength

A fiber reinforced composite material having a thickness of 2 mm in which the fibers are aligned monoaxially is produced. A test piece (12.7×230 mm) is taken from it so that the axial direction of the test piece is the same as the direction of the fiber alignment. The thickness of the test piece is 2 mm. A curvature of 125 mmR is provided in the central part in the thickness direction and the central part is finished in a thickness of about 1 mm. The tensile test is carried out at a stretching speed of 1 mm/min. The tensile strength is expressed in kg/mm$^2$.

The following examples illustrate the present invention more specifically.

REFERENTIAL EXAMPLE 1

Production of polytitanocarbosilane

Three parts by weight of polyborosiloxane was added to 100 parts by weight of polydimethylsilane synthesized by dechlorinating condensation of dimethyldichlorosilane with metallic sodium, and the mixture was subjected to thermal condensation at 350° C. in nitrogen. Titanium alkoxide was added to the resulting polycarbosilane having a main-chain skeleton composed mainly carbosilane units of the formula (Si—CH$_2$) and containing a hydrogen atom and a methyl group at the silicon atom in the carbosilane units, and the mixture was subjected to crosslinking polymerization at 340° C. in nitrogen to give polytitanocarbosilane composed of 100 parts of the carbosilane units and 10 parts of titanoxane units of the formula $+Ti-O+$. The resulting polytitanocarbosilane had a number average molecular weight of about 2,500.

REFERENTIAL EXAMPLE 2

Production of polyzirconocarbosilane

Three parts by weight of polyborosiloxane was added to 100 parts by weight of polydimethylsilane synthesized by dechlorinating condensation of dimethyldichlorosilane with metallic sodium, and the mixture was subjected to thermal condensation at 350° C. in nitrogen. Zirconium alkoxide was added to the resulting polycarbosilane having a main-chain skeleton composed mainly of carbosilane units of the formula (Si—CH$_2$) and containing a hydrogen atom and a methyl group at the silicon atom in the carbosilane units, and the mixture was subjected to crosslinking polymerization at 340° C. in nitrogen to give polyzirconocarbosilane composed of 100 parts of the carbosilane units and 9 parts of zirconoxane units of the formula $+Zr-O+$. The resulting polytitanocarbosilane had a number average molecular weight of about 2,800.

EXAMPLE 1

Commercial carbon fibers having a diameter of about 8.5 micrometers and a tensile strength of 250 kg/mm$^2$ were immersed in a 10% by weight n-hexane solution of the polytitanocarbosilane prepared in Referential Example 1, and heated in air at 150° C. for 3 hours and further in nitrogen gas at 1300° C. for 1 hour to form inorganic fibrous materials composed of a central layer of the carbon fibers and an inorganic surface layer. The inorganic fibrous materials had a tensile strength of 240 kg/mm$^2$.

The inorganic fibrous materials were monoaxially aligned, and aluminum foils (1070) were individually laid over them. By using hot rolls at a temperature of 670° C., the inorganic fibrous materials and the aluminum were consolidated to produce composite foils. Twenty seven such composite foils were stacked, left to stand in vacuum at 670° C. for 10 minutes, and then hot-pressed at 600° C. to produce an inorganic fiber-reinforced aluminum composite material. The composite material contained 30% by volume of the fibers and had a tensile strength, in the fiber direction, of 60 kg/mm$^2$, a flexural strength, in a direction at right angles to the fibers, of 28 kg/mm$^2$ and an interlayer shear strength of 7 kg/mm$^2$.

COMPARATIVE EXAMPLE 1

Commercial carbon fibers having a diameter of about 8.5 microns and a tensile strength of 250 kg/mm$^2$ were immersed in a 1.5% by weight n-hexane solution of polycarbosilane having a number average molecular weight of about 2,000 and then heated in air at 120° C. for 30 minutes to form a silicon oxide substrate layer on the surface of the carbon fibers. These carbon fibers were immersed in a 15% by weight n-hexane solution of the above polycarbosilane, and then heated at 1100° C. in a nitrogen gas atmosphere for 30 minutes to give fibrous materials having a silicon carbide ceramic as a surface layer. The resulting fibrous mterials had a tensile strength of 238 kg/mm$^2$.

An aluminum composite material was produced in the same way as in Example 1 except that the resulting fibrous materials were used instead of the fibrous materials used in Example 1. The composite material had a tensile strength, in the fiber direction, of 21 kg/mm$^2$, a flexural strength, in a direction at right angles to the fibers, of 18 kg/mm$^2$, and an interlayer shear strength of 3.9 kg/mm$^2$.

EXAMPLE 2

The reinforcing inorganic fibrous materials obtained in Example 1 were monoaxially aligned on aluminum alloy foils (6061) having a thickness of 0.5 mm, and aluminum alloy foils were laid over the fibrous materials. By using a hot roll at a temperature of 670° C., the inorganic fibrous materials and the aluminum alloy were consolidated to produce composite foils. Twenty seven such composite foils were stacked, left to stand in vacuum at 670° C. for 10 minutes, and then hot-pressed at 600° C. to produce a inorganic fiber-reinforced aluminum composite material. The composite material contained 30% by volume of the fibers and had a tensile strength, in the fiber direction, of 86 kg/mm$^2$, a flexural strength, in a direction at right angles to the fibers, of 38 kg/mm$^2$ and an interlayer shear strength of 10 kg/mm$^2$.

COMPARATIVE EXAMPLE 2

An aluminum composite material was produced in the same way as in Example 2 except that the polycarbosilane-clad carbon fibers obtained in Comparative Example 1 were used instead of the reinforcing inorganic fibrous materials used in Example 2. The composite material had a tensile strength, in the fiber direction, of 34 kg/mm$^2$, a flexural strength, in a direction at right angles to the fibers, of 21 kg/mm$^2$ and an interlayer shear strength of 6.7 kg/mm$^2$.

EXAMPLE 3

Example 1 was repeated except that alumina fibers (diameter 14 micrometers, tensile strength 160 kg/mm$^2$) were used instead of the inorganic fibers. Inorganic fibrous materials were obtained which were composed of a central layer of alumina fibers and an inorganic surface layer and had a tensile strength of 152 kg/mm$^2$.

The inorganic fibrous materials were monoaxially aligned, and aluminum foils (1070) were individually laid over them. By using hot rolls at a temperature of 670° C., the inorganic fibrous materials and the aluminum were consolidated to produce composite foils. Twenty seven such composite foils were stacked, left to stand in vacuum at 670° C. for 10 minutes, and then hot-pressed at 600° C. to produce an inorganic fiber-reinforced aluminum composite material. The composite material contained 30% by volume of the fibers and had a tensile strength, in the fiber direction, of 50 kg/mm$^2$, a flexural strength, in a direction at right angles to the fibers, of 23 kg/mm$^2$ and an interlayer shear strength of 5.2 kg/mm$^2$.

COMPARATIVE EXAMPLE 3

An inorganic fiber-reinforced aluminum composite material was produced in the same way as in Example 3 except that the same commercial alumina fibers as in Example 3 were used without treatment as reinforcing fibers. The resulting composite material contained 30% by volume of the fibers and had a tensile strength, in the fiber direction, of 40 kg/mm$^2$, a flexural strength, in a direction at right angles to the fibers, of 16 kg/mm$^2$ and an interlayer shear strength of 2.8 kg/mm$^2$.

What is claimed is:

1. An inorganic fibrous material for reinforcing composite materials, said fibrous material composed of a central layer and a surface layer, wherein
the surface layer is formed of an inorganic material composed of
   (i) an amorphous material consisting substantially of Si, M, C and O wherein M is Ti or Zr, or
   (ii) an aggregate consisting essentially of ultrafine crystalline particles of beta-SiC, MC, a solid solution of beta-SiC and MC, and $MC_{1-x}$ having a particle diameter of not more than 500 Å wherein M is as defined above and x is a number represented by $0<x<1$, or
   (iii) a mixture of the amorphous material (i) and the aggregate (2), and
the central layer is formed of an inorganic material other than said inorganic material.

2. The inorganic fibrous material of claim 1 wherein the inorganic material forming the central layer is at least one inorganic fibrous material selected from the group consisting of carbon fibers, alumina fibers, silicon carbide fibers, boron fibers and silicon carbide whiskers.

3. The inorganic fibrous material of claim 1 wherein the surface layer is formed in a thickness of about 0.1 to 50 micrometers on the surface of the central layer.

4. The inorganic fibrous material of claim 2 wherein the inorganic material forming the central layer has a diameter of about 1 to 200 micrometers for the fibers and about 0.1 to 2 micrometers for the whiskers.

5. The inorganic fibrous material of claim 1, wherein amorphous $SiO_2$ and $MO_2$ are present in said aggregate.

6. The inorganic fibrous material of claim 2, wherein amorphous $SiO_2$ and $MO_2$ are present in said aggregrate.

7. The inorganic fibrous material of claim 3, wherein amorphous $SiO_2$ and $MO_2$ are present in said aggregate.

8. The inorganic fibrous material of claim 4, wherein amorphous $SiO_2$ and $MO_2$ are present in said aggregate.

* * * * *